United States Patent [19]

Spruit et al.

[11] Patent Number: 5,153,873
[45] Date of Patent: Oct. 6, 1992

[54] OPTICAL RECORD CARRIER AND METHOD AND APPARATUS FOR INCREASING THE RESOLUTION OF INFORMATION RECORDED THEREON AND READ THEREFROM

[75] Inventors: Johannes H. M. Spruit; Gijsbertus Bouwhuis; Antonius H. M. Holtslag; Cornelis M. J. Van Uijen, all of Eindhoven, Netherlands

[73] Assignee: U.S. Philips Corporation, New York, N.Y.

[21] Appl. No.: 333,149

[22] Filed: Apr. 3, 1989

[30] Foreign Application Priority Data

May 24, 1988 [NL] Netherlands .................. 8801327

[51] Int. Cl.⁵ .............................................. G11B 7/00
[52] U.S. Cl. ................... 369/275.2; 369/100; 369/118; 369/109
[58] Field of Search ............ 369/275.1, 275.5, 109, 369/121, 13, 112, 288, 284, 44.12, 44.23, 288, 100, 110, 111, 118; 360/114; 365/121

[56] References Cited

U.S. PATENT DOCUMENTS

| | | | |
|---|---|---|---|
| 4,115,809 | 9/1978 | Ueno | 369/118 |
| 4,242,579 | 12/1980 | Bouwhuis | 369/112 |
| 4,414,650 | 11/1983 | Ohta et al. | 365/121 |
| 4,460,990 | 7/1984 | Opheij | 369/118 |
| 4,719,615 | 1/1988 | Feyrer et al. | 369/284 |
| 4,771,347 | 9/1988 | Horimai et al. | 369/284 |
| 4,792,331 | 1/1989 | Watada et al. | 369/288 |
| 4,818,666 | 4/1989 | Gravesteijn et al. | 369/100 |
| 4,853,912 | 8/1989 | Akasaka et al. | 369/13 |
| 4,860,274 | 8/1989 | Kobayashi | 369/275.2 |
| 4,965,784 | 10/1990 | Land et al. | 369/275.2 |

FOREIGN PATENT DOCUMENTS 0081632  4/1988  Japan .................................. 369/121

OTHER PUBLICATIONS

"Philips' Technical Review" 33 (1973) No. 7, pp. 178-180 and 186-189.
Translation of JP-63-81632.

Primary Examiner—Roy N. Envall, Jr.
Assistant Examiner—Thang V. Tran
Attorney, Agent, or Firm—David R. Treacy

[57] ABSTRACT

Recording and/or reading of information on an optical record carrier is effected by scanning such record carrier with a radiation beam which is focussed by an objective lens into a scanning spot of a size which is diffraction-limited by the aperture of the objective lens. The effective size of the scanning spot is considerably reduced by including a layer of non-linear optical material in the record carrier, such material having an optical characteristic which changes with changes in intensity of the radiation incident thereon. The read/write resolution of information on the record carrier is thereby substantially increased.

27 Claims, 8 Drawing Sheets

OPTICAL RECORD CARRIER AND METHOD AND APPARATUS FOR INCREASING THE RESOLUTION OF INFORMATION RECORDED THEREON AND READ THEREFROM

BACKGROUND OF THE INVENTION

1. Field of the Invention

The invention relates to a method of optically scanning an information plane of a record carrier by means of a scanning beam which is focused to form a scanning spot on the information plane, the scanning spot and the record carrier being moved relative to each other so that it scans such plane. The invention also relates to a record carrier, to a record carrier master which is used in the manufacture of such as record carrier, and to an optical scanning apparatus, all of which are suitable for use of the method.

Such method can be used for examining objects by means of a scanning optical microscope, but it is particularly suitable for scanning an optical record carrier having recorded thereon an audio or video program or digital data.

The information plane of a record carrier may be a plane already recorded with optically readable information on a plane in which information is to be inscribed. In the former case the scanning beam is a read beam and in the latter case the scanning beam is a write beam modulated with the information to be inscribed. The record carrier may be a round disc-shaped record carrier or a tape-shaped record carrier.

2. DESCRIPTION OF THE RELATED ART

Nowadays such record carriers and the associated read apparatus are used in large numbers. In addition to the robustness of disc-shaped record carriers, the large storage capacity is also an important factor which has contributed to the success of the optical recording systems. The optical disc having a diameter of 12 cm, which is known under the name of "Compact Disc" or "CD", may comprise, for example a digitised music program of one hour, whilst the larger optical disc having a diameter of 30 cm, which is known under the name of "Laservision Disc" may comprise a video program of one hour.

However, there is an ever increasing need of recording still larger quantities of information on such record carriers. While maintaining the diameter of present-day optical discs, which are easy to handle, this means that the information areas such as the known pits in the "CD" and "Laservision" discs and in the optical discs for digital data storage, or the magnetic domains in the magneto-optical discs which are inscribable and erasable must be smaller. The current techniques provide the possibility of inscribing such smaller information areas. However, reading these smaller areas is a problem.

In the present-day read apparatus a read objective lens system having a numerical aperture, NA, of the order of 0.45 is used. Semiconductor diode lasers such as an AlGaAs laser emitting radiation at a wavelength of the order of 800 nm are used as radiation sources. This radiation can be focused by the read objective to a diffraction-limited radiation spot whose half-value width (FWHM) is of the order of 1 micron. The half-value width is understood to mean the distance between the points in the radiation spot where the intensity is half the maximum intensity in the centre of the radiation spot. Information areas having a width of the order of 0.5 micron and an average length of the order of 1 micron can be well-separated read by means of this scanning spot.

In this reading operation use is made of diffraction of the read beam by the information areas. At the stated values of the wavelength, the numerical aperture and the size of the information areas, the information structure can be considered to be a two-dimensional diffraction grating which splits the incident radiation beam into a non-diffracted zero-order sub-beam, a plurality of diffracted first-order sub-beams and a plurality of sub-beams diffracted in higher orders. The zero-order sub-beam has a constant phase and amplitude and is not influenced by a movement of the information structure with respect to the scanning spot. However, the phase or amplitude of the first-order sub-beams is dependent on the movement of the information structure.

An objective concentrating the zero-order sub-beam and a part of the first-order sub-beams from the record carrier on a detector is arranged between the record carrier and a radiation-sensitive detector. When moving the information structure and the scanning spot with respect to each other, the phase of a first-order sub-beam varies with respect to that of the zero-order sub-beam. By interference of a portion of a first-order sub-beam with the zero-order sub-beam, the intensity of the radiation received by the detector varies. This intensity variation represents the information which has been read, i.e. the succession of information areas in the scanning direction.

The angles at which the first-order sub-beams and the higher-order sub-beams are diffracted depend on the local period of the information structure, i.e., the distance between the beginning of a first information area and that of a subsequent information area. In the case of a decreasing period, or an increasing spatial frequency, the diffraction angles become larger until (,at a given spatial frequency referred to as the "conventional" cut-off frequency,) the first-order sub-beams entirely fall outside the pupil of the objective. Information areas whose spatial frequency lies above this cut-off frequency can therefore no longer be detected.

To be able to read an information structure at a spatial frequency above the said conventional cut-off frequency, U.S. Pat. No. 4,242,579 issued Dec. 30, 1980, assigned to the present assignee, proposes to arrange the said objective, referred to as the observation objective in such Patent, asymmetrically in the zero-order sub-beam coming from the record carrier. Since the observation objective is displaced in the direction in which one of the first-order sub-beams is diffracted, this sub-beam is captured also at higher spatial frequencies. This beam interferes in the detector plane with a part of the zero-order sub-beam, resulting in an interference pattern. The variation in this pattern, representing the information which has been read, is detected by means of a detector whose width in the scanning direction is smaller than the period of the interference pattern. In the apparatus according to U.S. Pat. No. 4,242,579 stringent requirements are imposed on the alignment of the optical elements, notably if a reflecting information structure is read and a transparent protective coating is present on this structure. In practice the cut-off frequency can be increased to approximately 1.5 times the conventional cut-off frequency with this apparatus.

SUMMARY OF THE INVENTION

The present invention has for its object to provide novel ways of reading optical information structures at spatial frequencies which are considerably higher than the conventional cut-off frequency, whilst the read apparatus in principle requires little or no adaptation.

The read method according to the invention is characterized in that use is made of a principally diffraction-limited scanning spot in combination with a layer of non-linear optical material in which the radiation of the scanning beam establishes an optical effect which results in a discrimination within the scanning spot so that the effective scanning spot is considerably smaller than the original scanning spot.

A diffraction-limited radiation spot is understood to mean a scanning spot whose size is determined by the diffraction at the aperture of the lens by which the spot is formed. Such a spot has a so-called Airy distribution, that is to say it comprises a central circular portion having an intensity decreasing from the center to the edge and a plurality of rings around the circle having a smaller, also outwardly decreasing intensity. The invention notably utilises the fact that only in a portion of the central circle is the intensity high enough to produce a usable non-linear optical effect, so that scanning is substantially performed only with that portion of the radiation spot. The said portion of the scanning spot is referred to as the effective scanning spot.

A non-linear optical material is understood to mean a material whose optical properties vary under the influence of incident radiation. The said variation may be particularly a variation of the transmission of reflection coefficient or of the refractive index of the material, or a variation of the shape of the layer of non-linear optical material. As will hereinafter be described in greater detail, the following materials are generally suitable as non-linear optical materials:

1. materials an optical property of which varies under the influence of a thermal effect,
2. so-called optical bleaching materials,
3. materials which are known as bistable optical materials, and
4. materials having higher-order optical non-linearities. Such materials are well known, being described, for example, in the textbook "Non-Linear Optical Properties of Organic And Polymeric Materials" by D. J. Williams, pub. by American Chemical Society, Washington D.C. 1983. A general introduction to the subject of non-linear optics can be found, for example, in the textbook "Non-Linear Optics" by H. Bloemberger, pub. by Benjamin, New York, 1965.

Similarly to a direct optical object-to-image transformation, that is to say optical imaging in the classical sense of the word, a modulation transfer function can be allocated to optical scanning, that is to say a point-by-point transformation. The modulation or contrast transfer function (MTF) is defined as the ratio between the contrast in the image and that in the object. This modulation transfer function decreases with an increasing spatial frequency of information areas in the object. At a cut-off frequency, referred to as the conventional optical cut-off frequency, this function becomes equal to zero. In the conventional method of scanning optical information structures via linear media whose optical properties do not change, the modulation transfer function is entirely determined by the numerical aperture and the wavelength of the scanning beam if the detection aperture is larger than or equal to the aperture of the beam incident on the information structure. The numerical aperture of the scanning beam is equal to the numerical aperture of the objective with which the scanning beam is focused to a scanning spot. The detection aperture is the aperture of the beam which can be received by the radiation-sensitive detector. This aperture may be equal to the numerical aperture of a collecting lens between the record carrier and the detector, but it may be alternatively determined by the aperture of the detector itself. Under the above-mentioned condition the cut-off frequency $f_c$ is given by: $f_c = 2.NA/\lambda$ so that the highest spatial frequency in the information structure which can still be read is smaller than $2.NA/\lambda$.

The present invention is based on the recognition that the use of a non-linear material, i.e. a material whose optical properties change under the influence of the scanning beam, in combination with a more centralized energy distribution across the cross-section of this beam, leads to a variation of, for example the transmission or reflection coefficient, within a small region of the radiation spot. This superimposes on the original linear transmission or reflection coefficient a non-linear component at the area of the scanning spot and which moves along with this spot. The last-mentioned component represents a sub-spot or effective scanning spot which is considerably smaller than the original scanning spot and whose side lobes, in contrast to those of the original radiation spot, are negligible. The effective scanning spot provides the possibility of reading considerably smaller information areas of a record carrier. More generally, smaller details of an object can be detected than with the original scanning spot. The resolution of the optical scanning system is therefore improved.

In terms of the modulation transfer function, the method according to the invention results in a non-linear sub-function being superimposed on the original modulation transfer function determined by NA and $\lambda$. It is true that this non-linear sub-function has a smaller maximum, but it has also a considerably smaller range and a higher cut-off frequency than the original function. The difference in cut-off frequency may be a factor of two or even more.

The cut-off frequency can even be further increased by using materials having higher-order non-linearities, whether or not in combination with a larger detection aperture. The detection limit will be ultimately determined by the signal-to-noise ratio, in contrast to the conventional optical scanning in which there is a sharp limit at the cut-off frequency $f_c = 2.NA/\lambda$.

It is to be noted that the Article "Superresolution in Microscopy and the Abbe Resolution Limit" in "Journal of the Optical Society of America", Vol. 57, No. 10 (October '67) pages 1190–1192 gives a theoretical discourse on how superresolution, even to infinitely high spatial frequencies, could be achieved by providing a so-called stop or diaphragm against the object. However, this Article also observes that it is virtually impossible in practice to manufacture such a diaphragm with the desired small opening and to place it in the desired position. The great advantage of the present invention is that the scanning spot itself creates a kind of stop function in the non-linear layer so that it is possible for the first time to realise the desired superresolution in practice.

A very important application of the invention relates to reading optical record carriers. For that application, use is made of a novel type of record carrier which is characterized by a layer of non-linear optical material which is located within the depth of focus of the information plane.

The layer of non-linear optical material may be constituted by the layer in which the information is or can be inscribed. However, there are also embodiments in which a separate layer of non-linear optical material is present in addition to the information layer. In that case it must be ensured that the non-linear layer is located so close to the information plane that the size of the scanning spot in this layer does not deviate very much from that of the diffraction-limited scanning spot in the information plane. Since the size of the scanning spot is adapted to the information structure and since this size depends on the numerical aperture of the objective system with which the scanning spot is formed, and since furthermore the depth of focus of the objective system is inversely proportional to the square value of the numerical aperture, it is permissible to refer to the depth of focus of the information plane, which term is preferred to enable a concise description of the above-mentioned requirement.

The record carrier according to the invention has many embodiments which are distinguishable in accordance with two criteria. The first criterion relates to facilities provided by the record carrier.

A first embodiment in accordance with the first criterion is characterized in that the information plane has a permanent information structure which is constituted by information areas arranged on information tracks, said areas alternating in the track direction with intermediate areas and being optically distinguished therefrom.

A permanent information structure is understood to mean an information structure provided by the manufacturer of the record carrier, the information areas being preferably constituted by pits in, or hills on, the recording surface. A record carrier having such a structure can only be read by the user, and it cannot be erased and inscribed again.

A second embodiment in accordance with the first criterion relates to a record carrier which can be inscribed once and is characterized in that the information plane has a permanent servo-track structure for positioning the scanning spot in the information plane. Such a record carrier is often of the so-called ablative type in which, for example pits can be melted in the information surface by means of the energy of the write beam. Another possibility is to inscribe by forming non-erasable crystalline areas in an amorphous layer, or conversely. The permanent servo-track structure is provided by the manufacturer of the record carrier. With this structure it can be ensured that the scanning spot follows an accurately defined path in the information plane, but also that the scanning is in the correct position along the track direction at a given moment.

A third embodiment in accordance with the first criterion relates to a record carrier which can be inscribed and erased several times and is characterized in that the information plane has a permanent servo-track structure for positioning the scanning spot in the information plane. The servo-track structure has the same function as that in the second embodiment. Examples of an information layer for the third embodiment may be a magneto-optical layer, or a so-called phase change layer in which a transition from the amorphous phase to the crystalline phase and conversely can be locally realised by means of optical radiation. A third example of an information layer which can be inscribed and erased several times is a double layer of a first synthetic material layer having a relatively high thermal coefficient of expansion and a glass transition temperature which is below room temperature and a second synthetic material layer which is connected to the first synthetic material layer and which has a relatively low coefficient of expansion and a glass transition temperature which is above room temperature. Such a double layer whose first layer is referred to as the expansion layer and whose second layer is referred to as the retention layer is described in European Patent Application No. 0,136,070.

A fourth embodiment in accordance with the first criterion relates to a record carrier intended as a master for initially and optically inscribing a track-shaped structure which can be replicated in a record carrier according to the first, second or third embodiment, which record carrier has a substrate and a radiation-sensitive layer.

The track-shaped structure on the master may be an information structure or a servo-track structure and is converted into a relief pattern suitable to be transferred onto further record carriers by means of known-pressing or replica techniques. The radiation-sensitive layer may be photo-sensitive layer, but alternatively may be an expansion-retention double layer as referred to above which can be erased and inscribed several times.

The above-mentioned first to fourth embodiments of the record carrier are distinguished from the known record carriers in that they have a layer of non-linear optical material which is located within the depth of focus of the information plane.

The second criterion by which the record carriers according to the invention are distinguishable relates to the type of non-linear layer with which the supperresolution effect is realised.

A first embodiment in accordance with the second criterion, is characterized in that the non-linear optical material is a material whose transmission changes with a changing intensity of the incident radiation. An example of such a layer is known in literature under the name of "bleaching layer" whose transmission increases with an increasing intensity of the incident radiation. Such known materials include arsenides and antimonides of gallium and indium.

It is to be noted that the use of bleaching layers is know per se in photolithographic techniques for manufacturing integrated circuits. However, in these techniques the bleaching layer is used to sharpen the edges of the separate elements in the circuit patterns which must be provided in the semiconductor, and it is not used to limit the total imaging beam as in the present invention.

Such first embodiment of the record carrier may be further characterized in that the material having a transmission which changes under the influence of the intensity is a saturating dye. For example, with an increasing intensity this dye becomes more and more transparent to radiation of a given wavelength.

However, the first embodiment is preferably further characterized in that the material having a transmission which changes under the influence of the intensity is a bistable optical material.

This material is described in "Optics Communications", Vol. 59 (1984) No. 5, pages 359–361 for use in optical switches and optical computers. At a given intensity level the transmission of this material increases stepwise and the transmission decreases stepwise when the intensity is decreased to below this level. The bistable or optical material is eminently suitable for realising the superresolution effect because it acts substantially without delay.

A layer whose transmission changes with a changing intensity can be used in a record carrier having a permanent information structure, in a record carrier which is inscribable once and in a record carrier which is inscribable and erasable several times, and it is eminently suitable for use in a record carrier serving as a master in the manufacture of a large number of identical record carriers having an information track structure or a servo-track structure.

A second embodiment in accordance with the second criterion, of the record carrier is characterized in that the non-liner optical material is a material whose refractive index changes when changing the intensity of the incident radiation.

Both the real part of the refractive index and the imaginary part of a complex refractive index may change, in other words the non-linear optical effect may be both an amplitude effect and a phase effect. As an example of such a layer which may be provided both in front of and behind the recording layer, a layer may be mentioned which comprises a phase change material. It has been found that the complex refractive index of this type of materials, both in the amorphous and in the crystalline phase, is temperature dependent to such an extent that the radiation whose intensity is too small to realise a phase change can still establish a sufficiently large change of the refractive index in both phased to enable these materials to be used as non-linear materials in the sense of the present invention.

A sub-embodiment of record carrier having a phase change material as a non-linear optical material is further characterized in that the layer of non-linear optical material is also the information layer. When inscribing this record carrier with a first high-intensity level, the amorphous phase is locally converted into a crystalline phase, or conversely, whilst during reading with a second low-intensity level the refractive index is temporarily changed without a phase change taking place.

A third embodiment in accordance with the second criterion, of the record carrier is characterized in that the non-linear optical material is a synthetic material having a relatively high thermal coefficient of expansion.

In such an expansion layer a scanning beam having an intensity which is lower than the write intensity can locally establish a surface deformation so that a discrimination within the scanning beam takes place again and effectively a smaller scanning spot is formed in the information plane.

An expansion layer and a layer having a variable refractive index can be used in record carriers having a permanent information structure or in record carriers which are inscribable once or several times. For example, in the embodiment having an expansion layer as a non-linear, layer the information layer may also be an expansion layer in combination with a retention layer.

A fourth embodiment in accordance with the second criterion, of the record carrier in which the information layer comprises a magneto-optical material in which magnetic domains can be written by means of a magnetic field and a radiation beam, which domains can be read on the basis of a change of polarisation of a scanning beam, is characterized in that the non-linear layer is constituted by a magneto-optical information layer whose polarisation change depends on the temperature.

This embodiment of the record carrier utilises for the first time the fact that the polarisation change caused by a magnetic domain in the magneto-optical information layer, which change has the form of a rotation of the polarisation direction or the form of a change of the polarisation ellipticity, is dependent on the temperature of this layer.

The magneto-optical record carrier may be further characterized in that a layer of non-linear optical material is provided within the depth of focus of the magneto-optical layer.

The non-linear effect can be increased considerably by means of the extra layer. It is also possible to use substantially only the non-linear effect of the extra layer.

A preferred embodiment of a record carrier having one of the above-mentioned types of non-linear optical layers is characterized in that the non-linear optical layer forms part of a pack of layers constituting a resonance structure for the scanning radiation.

By creating a resonance structure in the record carrier, the non-linear effect can be increased considerably. The non-linear layer itself has a transmission (T) versus optical thickness (nd) characteristic which is sinusoidal, (n being the refractice index and d being the geometrical thickness of the layer). The value nd is chosen to be such that around the corresponding point on the characteristic curve, the working point, the curve has a maximum slope. The optical thickness nd of the layer will usually deviate from $N \cdot \frac{\lambda}{4}$ in, which $\lambda$ is the wavelength of the scanning radiation and N is an integer, because at $nd = N \cdot \frac{\lambda}{4}$ an extreme is usually achieved in the characteristic curve. The non-linear effect of the layer thus optimised can be increased by adapting the optical thicknesses $n_i \cdot d_i$ of other layers which are already present in the record carrier so that these layers, combined with the non-linear layer, constitute a resonance structure. For this pack of layers the sum $$\sum_{i=1}^{x} n_i \cdot d_i,$$

in which x is the number of layers and $n_i$ and $d_i$ are the refractive index and the geometrical thickness of the lay i, is chosen to be such that around the corresponding point on the characteristic curve the slope of such curve is a maximum.

The embodiment of the record carrier having a resonance structure may be further characterized in that a plurality of extra layers is provided which, combined with the non-linear layer, constitute the resonance structure.

The layers which are already present in the record carrier then need not be altered. The same criterion for the total optical thickness as indicated above applies to the pack of layers including the extra layers.

When using non-linear optical materials an optimum supperresolution signal is obtained if the local non-linear optical effect is only present in the time interval during which the scanning spot remains in the area of this effect, in other words if the local effect disappears immediately after the central portion of the scanning spot has disappeared from this local position. The scanning spot is then reduced both on the front side and on the rear side, viewed in the direction of movement of the spot. The supperresolution signal will then have a maximum signal-to-noise ratio. Materials which have the short recovery time required for this purpose, or which are quickly reversible are, for example, bleaching materials or bistable optical materials.

When using non-linear optical materials having a longer recovery time, such as those in which the non-linear effect is mostly established via a thermal effect, the signal-to-noise ratio of the superresolution signal is smaller but it is still sufficiently large to utilise the effect. When scanning a record carrier provided with such a material, the non-linear effect occurs on the front and rear sides of the scanning spot, but since this effect remains present for some time and trails the scanning spot like a kind of comet tail, only the reduction of the scanning spot on its front side and the increase of the steepness at that side contributes to the superresolution effect.

For reading record carriers according to the invention it is possible to use known scanning apparatus comprising a radiation source, an objective system for focusing a radiation beam from the radiation source to a diffraction-limited scanning spot on the information plane, and a radiation-sensitive detector for converting radiation from the information plane into an electric signal. In the known scanning apparatus the objective system between the radiation source and the information plane has the same numerical aperture as the objective system between the information plane and the detector; in the case of a reflecting record carrier there is only one objective system.

According to the invention the scanning apparatus can be optimised for the superresolution effect. Such a novel scanning apparatus is characterized in that the detection aperture is larger than the aperture of the scanning beam incident on the record carrier.

The detection aperture is the aperture of the beam which can be received by the radiation-sensitive detector. In most cases this aperture will be defined by the opening of an optical element between the record carrier and the detector.

A preferred embodiment of the scanning apparatus according to the invention, intended for scanning a reflecting record carrier, is further characterized in that the objective lens system comprises a round central portion which is sufficiently corrected and which has a sufficient optical quality for forming the diffraction-limited radiation spot, and a contiguous annular portion which can receive radiation from the record carrier.

The annular lens portion should only collect light and need not image it, also may have a considerably lower optical quality then the central lens portion. Radiation from the record carrier, which falls outside the central portion of the objective system can be captured and determined by the annular lens port. The information in information areas which are considerably smaller than the scanning spot formed by the objective system, and which can be read by means of the superresolution effect, is particularly present in such radiation. Consequently, the last-mentioned scanning apparatus is better suited to achieve the superresolution effect than the conventional apparatuses.

The objective lens system may be formed in known manner by means of a single lens element having one or two aspherical refractive surfaces, by a holographic lens or by a lens element having a radially varying refractive index.

The radiation through the annular lens portion can be received by the detector which also receives the radiation through the central lens portion. However, the scanning apparatus according to the invention may be further characterized in that an extra detector is provided for receiving the radiation passing through the annular lens portion.

The signal which is due to the superresolution effect can then be separately detected and treated, whilst moreover conventional discs can also be read with this apparatus.

BRIEF DESCRIPTION OF THE DRAWINGS

The invention will now be described in greater detail, by way of example, with reference to the accompanying drawings in which.

DESCRIPTION OF THE PREFERRED EMBODIMENTS

Figure 1:
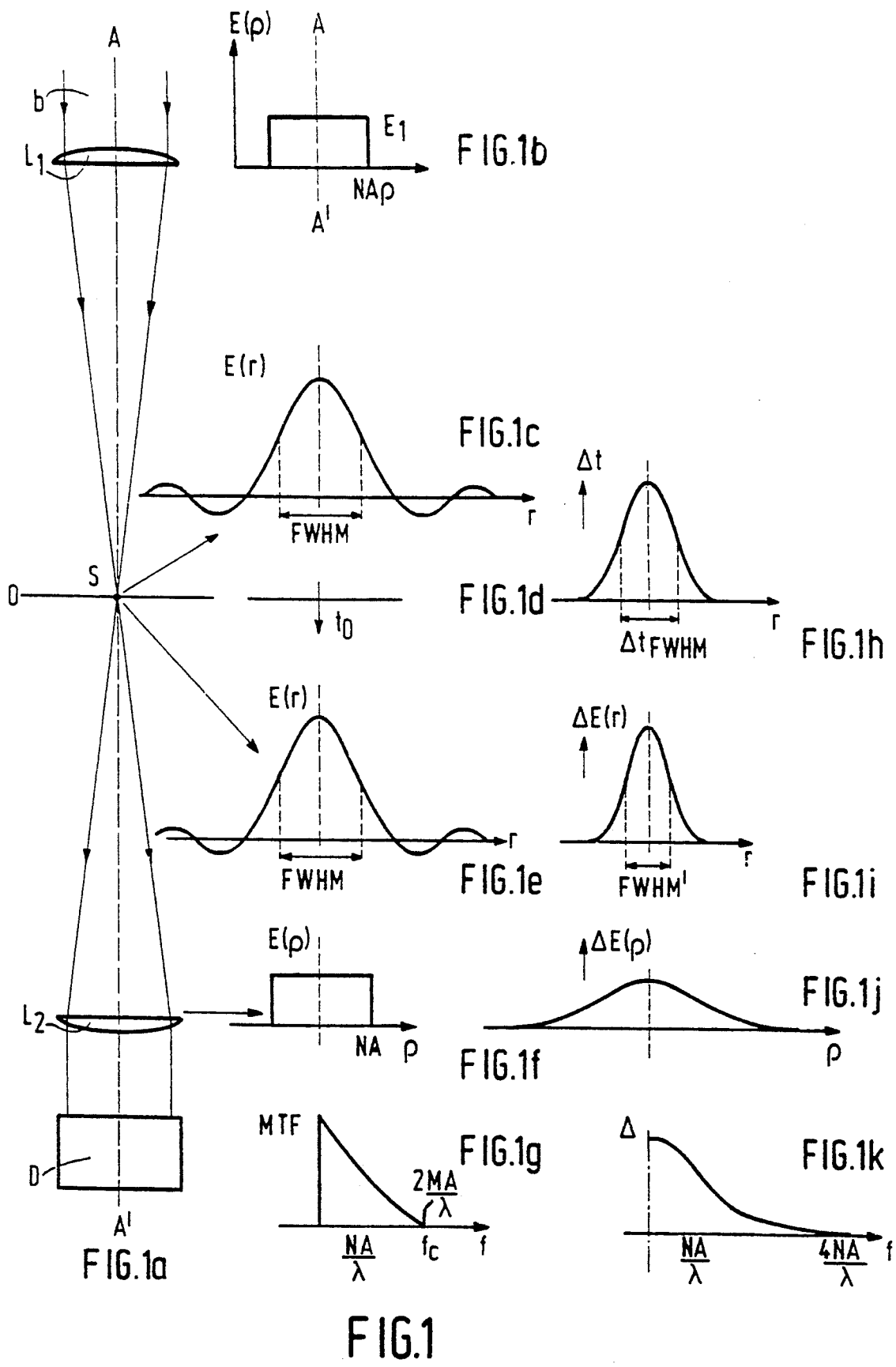
FIGS. 1a to 1k show the principle of the invention.

FIG. 1a shows diagrammatically how a radiation beam b with a plane wavefront is focused by an objective $L_1$ on a transmission object O and how the radiation through the object is concentrated by a second objective $L_2$ on a radiation-sensitive detector D. The variation of the far field $E(\rho)$ which is passed by the objective $L_1$ as a function of the radius $\rho$ is shown in FIG. 1b. This field has a constant value $E_1$ within the numerical aperture NA of the objective and is equal to zero outside it. The objective $L_1$ forms a diffraction-limited radiation spot S on the object O, the field $E(r)$ (FIG. 1c) having the known Airy distribution which is given by the function $J_1(r)/r$ in which $J_1(r)$ is the first-order Bessel function. This radiation spot consists of a central bright circle and several rings surrounding it and having a weaker, outwardly decreasing field strength. FIG 1c also shows the half-value width FWHM of the radiation spot, i.e. the distance between the points where the field strength is equal to half that in the centre of the spot. This FWHM is, for example 0.71 $\lambda/NA$ in which $\lambda$ is the wavelength of the radiation used.

The object O is assumed to be a homogeneous layer so that the transmission t is independent of the position of the spot S on the object (FIG. 1d). If this layer is a linear layer, i.e. the transmission is not influenced by the incident radiation, the field $t_0.E(r)$ behind the layer has the same shape and the same half-value width as the field $E(r)$ incident on the layer as is shown in FIG. 1e. The field at the location of the detection aperture of the objective $L_2$, also referred to as the far field of the object, is the Fourier-transform $E(\rho)$ of $E(r)$, the inverse of the transformation which is brought about by the objective $L_1$. The said far field is shown in FIG. 1f. For the sake of simplicity it is assumed that the numerical aperture of the objective $L_2$ is equal to the numerical aperture NA of the objective $L_1$. This situation occurs inter alia when reading a reflecting record carrier. The modulation transfer function MTF is obtained by convolution of the far field with the detection aperture. This function, which is shown in FIG. 1g, has a cut-off frequency $f_c$ which is equal to $2.NA/\lambda$ for the case considered.

If the object O is a layer of non-linear material, its transmission changes under the influence of the energy of the scanning beam b. This energy is given $E(r).E^*(r)$ in which $E^*(r)$ is the complex conjugate of $E(r)$. For an object of non-linear material the transmission $t(r)$ is given in a first approximation by:

$$t(r) = t_0 + \Delta t, \text{ with}$$

$$\Delta t = \gamma E(r).E(r)^*$$

in which $\gamma$ is a factor which is dependent on the type of material and its thickness and on the surrounding media. The term $t_0$ represents the linear portion of the transmission and $\Delta t$ is the non-linear contributor. The non-linear transmission term is shown in FIG. 1h. To this term also a half-value width $\Delta t_{FWHM}$ can be allocated which is for example $0.51 \lambda/NA$. Due to the non-linear term $\Delta t$ at the field behind the object O not only has acquired the linear field term $E(r)$ shown in FIG. 1c but also a non-linear field term $\Delta E(r)$. This term is given by $$\Delta E(r) = \Delta t.E(r), \text{ hence by}$$

$$\Delta E(r) = \gamma.E(r).E(r).E(r)^*$$

and is shown in FIG. 1i. The term $\Delta E(r)$ represents a radiation spot with negligible side lobes whose half-value width FWHM is considerably smaller, $0.42 \lambda/NA$ in the given model than that of the radiation spot which is represented by the field term $E(r)$ in FIG. 1c. The resolving power of the first-mentioned radiation spot is larger than that of the last-mentioned spot. The Fourier-transformed $\Delta E(\rho)$ of the field term $\Delta E(r)$, or the non-linear contribution to the far field at the location of the detection aperture, is given by the convolution.

$$\Delta E(\rho) = \gamma.E(\rho) \times E(\rho)^* \times E(\rho)$$

in which $E(\rho)$ is equal to the far field of the homogeneously filled Airy circle.

As is show in FIG. 1j $\Delta E(\rho)$ is more extensive than $E(\rho)$. In the example considered $E(\rho)$ ranges from NA to +NA, whilst $\Delta E(\rho)$ ranges from $-3$ NA to $+3$ NA. By convolution of the far field term $\Delta E(\rho)$ with the detection aperture, the aperture of the objective $L_2$, the non-linear portion of the modulation transfer function $\Delta MTF$ is obtained which is shown in FIG. 1k. For the given model the cut-off frequency $f_c'$ of $\Delta MTF$ is twice as high as the cut-off frequency $f_c$ of a conventional diffraction-limited optical scanning system.

If the radiation from the object O is received by one detector D, the functions according to FIGS. 1g and 1k are added so that a resultant modulation transfer function $MTF_s$ is obtained which has a cut-off frequency of $f_c'$. The optical scanning apparatus thus has acquired an increased resolving power although the size of the scanning spot S is not reduced. This phenomenon is referred to a s superresolution.

Figure 2:
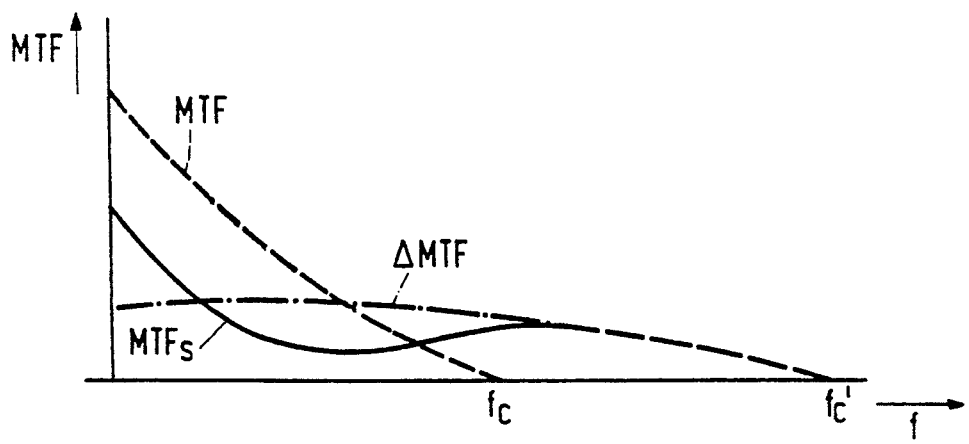
FIG. 2 shows examples of modulation transfer functions which can be obtained when using the invention.

The nature of the non-linear effect is irrelevant for the superresolution effect itself. $\Delta t$ may be large or small, positive or negative or even complex and anisotropic, as will hereinafter be explained. Anisotropic is understood to mean that the effect depends on the polarisation direction, or the direction of the E vector of the radiation. The nature of $\Delta t$ is important only for spatial frequencies in the object which are smaller than $f_c$. If the non-linear portion in the frequency range from 0 to $f_c$ is added to the linear portion and if the phase of the non-linear effect is opposed to that of the linear effect, a local minimum in the resultant transfer function $MTF_s$ is produced, as is shown in FIG. 2.

Figure 3:
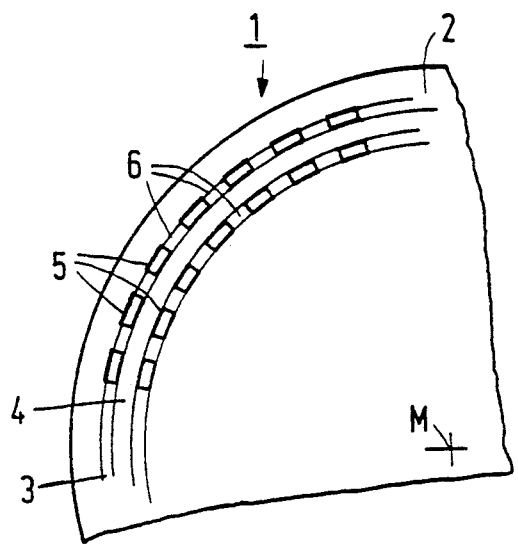
FIG. 3 is a plan view of an embodiment of an optical record carrier.

The object which is scanned is of course not homogeneous, as has been assumed in the foregoing, but it has a given structure. In the case of an optical record carrier this structure comprises a pattern of information areas. FIG. 3 shows a portion of such a record carrier in a plan view. A large number of information tracks 3 which are separated from one another by informationless intermediate lands 4 is present in the information plane 2 of the record carrier 1. The information tracks may be concentrical tracks or quasi-concentrical contiguous tracks constituting one spiral track. The information tracks 3 are composed of information areas 5 alternating in the track direction with intermediate areas 6. The information may be a so-called phase structure and may comprise pits sunk in the information surface or hills located on this surface. Such a structure influences the phase of the radiation incident thereon. The information areas may also be distinguished from the rest of the information surface in that they have a different reflection or transmission coefficient. When reading such information areas, the amplitude of the scanning beam is varied. Furthermore the information areas may comprise magnetic domains whose magnetisation direction is opposed to that of the surroundings. In that case a magneto-optical record carrier is concerned which can be read by using the polarisation rotation, or the Kerr effect, in the scanning beam caused by the areas. In all these cases the information is encoded in the succession of information areas in the track direction.

Figure 4:
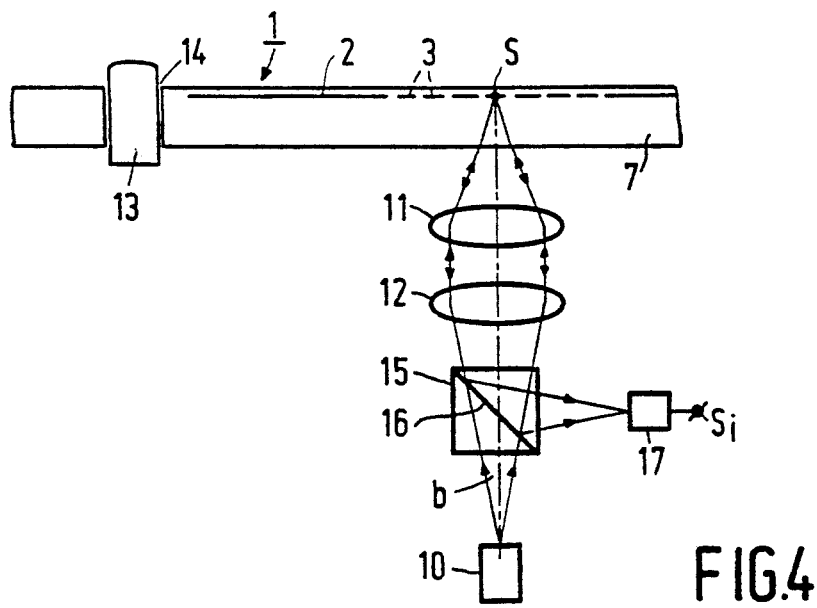
FIG. 4 shows an embodiment of an optical scanning apparatus.

FIG. 4 shows a portion of the record carrier 1 in a radial cross-section and it shows diagrammatically a read apparatus for this carrier. The information surface 2 is reflective and the substrate 7 of the record carrier is transparent so that the information can be read with a scanning beam b which passes this substrate twice. The beam b is supplied by a radiation source 10, for example a semiconductor diode laser and is focused by an objective 11 to a scanning spot S on the information plane 2. The objective 11 may be preceded by a collimator lens 12 which converts the diverging beam from the source into a parallel beam having such a cross-section that the pupil of the objective 11 is well filled and the scanning spot S is a diffraction-limited radiation spot of minimum dimension.

One track revolution can be scanned by rotating the record carrier with the aid of a shaft 13 projecting through the central opening 14. All tracks or the entire spiral track can be scanned by radially moving the scanning spot and the record carrier with respect to each other. The scanning beam is modulated in accordance with the succession of information areas and intermediate areas in the track direction. The modulated scanning beam is reflected by the information plane in the direction of the source 10. A beam splitter 15, for example a prism having a semi-transparent face 16 is arranged between the source and the objective 11, which prism passes a part of the reflected beam to a radiation-sensitive detector 17. This detector then supplies an electric signal $S_i$ which is modulated in accordance with the information which has been read.

The structure consisting of information areas can be considered as a two-dimensional diffraction grating splitting the incident scanning beam into a non-diffracted zero-order sub-beam, a plurality of first-order sub-beams and a plurality of higher-order sub-beams. Only the first-order sub-beams are important for the present invention because the energy of the higher-order sub-beams is only small.

Figure 5A:
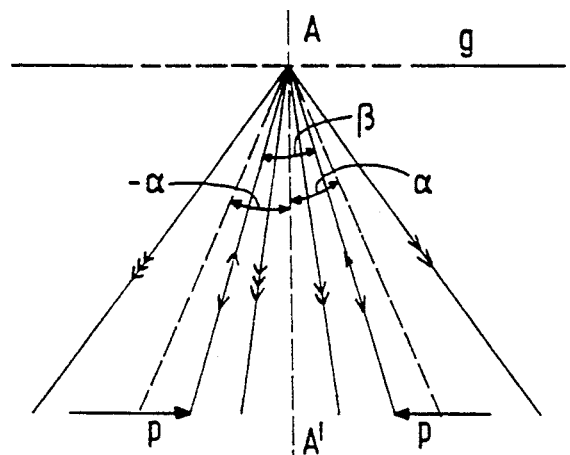
FIGS. 5a, 5b and 5c are sectional views of different-order sub-beams in the far field of the information structure in those cases where there is no non-linear effect or where there is a non-linear effect.
Figure 5B:
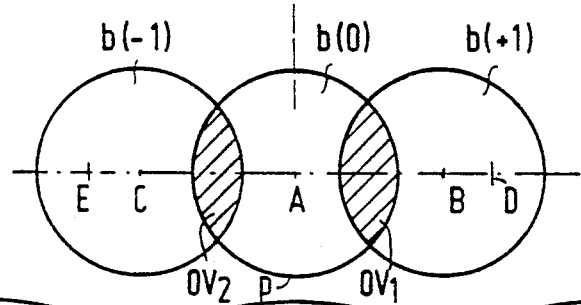

FIG. 5a is a cross-sectional view of a linear grating g. This grating is exposed with a beam b from an objective only the pupil p of which is shown. The grating g diffracts the beam and splits it into a zero-order sub-beam b(0), a +1-order sub-beam b(+1), a −1-order sub-beam b(−1) and a plurality of higher-order sub-beams not shown. The sub-beams b(+1) and b(−1) are diffracted at angles $+\alpha$ and $-\alpha$, respectively. FIG. 5b shows the cross-sections of the beams at the location of the pupil.

The sub-beam b(0) which in the absence of a non-linear effect has the same angular aperture $\beta$ and the same direction as the incident beam b entirely falls within the pupil and is passed on to the detector (17 in FIG. 4) in the case of an optical scanning apparatus by which the information grating g is read. The zero-order sub-beam does not comprise information about the succession of the information areas and intermediate areas. This information is especially present in the first-order sub-beams b(+1), b(−1). Of these sub-beams only the portions denoted by the shaded areas $OV_1$ and $OV_2$ fall within the pupil. When reading the information, the phase variations in the sub-beams b(+1) and b(−1) with respect to the zero-order sub-beam are used. In the areas $OV_1$ and $OV_2$ in FIG. 5b the first-order sub-beams overlap with the zero-order sub-beam and interferences occur. The phases of the first-order sub-beams change when moving the scanning spot over an information track. Consequently, the intensity of the total radiation passing through the objective and received by the detector changes.

If the centre of the scanning spot coincides with the centre of an information area, for example a pit, there is a given phase difference $\psi$ between a first-order sub-beam and the zero-order sub-beam. This phase difference is also referred to as phase depth of the information structure. If the scanning spot moves from a first information area to a second area, the phase of the +1-order sub-beam increases and this phase is increased by $2\pi$ at the moment when the centre of the scanning spot has arrived in the centre of the second information area. The phase of the −1-order beam simultaneously decreases. The phrases of the first-order sub-beams with respect to those of the zero-order sub-beam can thus be represented by $$\phi(+1) = \psi + 2\pi \frac{x}{p_t}$$

$$\phi(-1) = \psi - 2\pi \frac{x}{p_t}$$

in which x is the position in the tangential direction of the scanning spot and $p_t$ is the local tangential period of the information structure. The electric output signals of two detectors arranged behind the transition areas $OV_1$ and $OV_2$ can then be represented by $$S_1 = \cos\left(\psi + 2\pi \frac{x}{p_t}\right)$$

$$S_2 = \cos\left(\psi - 2\pi \frac{x}{p_t}\right)$$

The information signal $S_j$ is obtained by adding these detector signals:

$$S_i = S_1 + S_2 = 2 \cdot \cos\psi \cos\left(2\pi \frac{x}{p_t}\right)$$

The above applies only as long as there is still an overlap between the sub-beams b(+1) and b(−1) on the one hand and b(0) on the other hand. The angle $\alpha$ at which the first-order sub-beam is diffracted is given by $\sin\alpha = \lambda/p_t = \lambda.f$ in which f is the spatial frequency of the grating g or the local spatial frequency of the information structure. There is no longer any overlap if $\alpha = 2\beta$. Since $\sin\beta = NA$, the classical cut-off frequency $f_c$ is given by:

$$f_c = 2 \cdot NA/\lambda$$

Figure 5C:
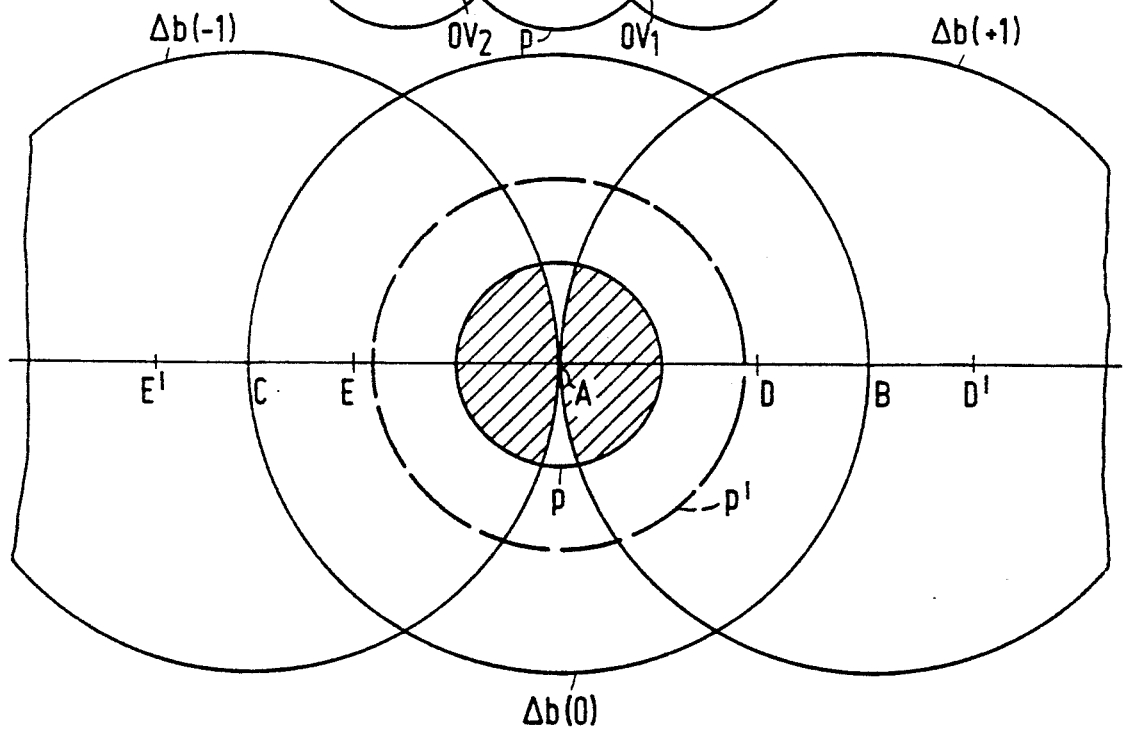

This applies if the medium which is in front of the information structure is a linear medium such as air or glass and if the angular aperture of the first-order sub-beam is equal to that of the zero-order sub-beam. If, as proposed in the present invention, a non-linear medium is arranged in the immediate vicinity of the information structure, and if the radiation beam has the energy distribution shown in FIG. 1c so that a temporary non-linear effect is created in the path traversed by the scanning beam, the energy distribution in the far field of the information structure will be more extensive, as is shown in FIG. 1j. This means that the zero-order and the first-order sub-beams have become wider, as is shown in FIG. 5c by means of the circles $\Delta b(0)$, $\Delta b(+1)$ and $\Delta b(-1)$. Whilst in the situation of FIG. 5b the cut-off frequency is reached if the centres B and C of the sub-beams b(+1) and b(−1) are shifted to D and E, respectively, the cut-off frequency in the situation of FIG. 5c is not achieved until B and C have moved to D' and E', respectively, in the case of an equal size of the detection pupil P because only then there is no overlap within the pupil p of the first-order sub-beam $\Delta b(+1)$ and $\Delta b(-1)$ with the zero-order sub-beam $\Delta b(0)$. The distances AD' and AE' are twice as large as the distances AD and AE, respectively, so that the cut-off frequency is increased by a factor of two in the given model when a non-linear effect occurs.

It follows also from FIG. 5c that when using a larger detection aperture, hence a larger pupil p', there the situation of no overlap within this pupil between the first-order sub-beams and the zero-order sub-beam occurs only at even larger outward movements of the centres B and C of the first-order sub-beams $\Delta b(+1)$ and $\Delta b(-1)$, so that the cut-off frequency becomes even larger.

Due to the larger width of the sub-beams $\Delta b(0)$, $\Delta b(+1)$ and $\Delta b(-1)$ the energy of these beams in the overlap areas is smaller than that of the sub-beams $b(0)$, $b(+1)$ and $b(-1)$ in the overlap areas $OV_1$ and $OV_2$ in FIG. 5b. The amplitude of the superresolution signal is therefore smaller than that of the information signal $S_i$ which is obtained in the conventional manner but is still sufficiently large to enable reading. Only at non-linear effects with very small dimensions, which would be required for reading very small information areas (for example smaller than 0.2 μm), the sub-beams could "blow-up" to such an extent that the information signal would acquire a too small signal-to-noise ratio at an acceptable energy of the scanning beam.

It is important for the present invention that the non-linear optical effect is present in the immediate vicinity of the information structure or in the information layer itself in order that the beam is effectively narrowed in the plane of the information structure. In other words: the non-linear layer must be present within the depth of focus of the information structure, whilst the depth of focus is related in a first approximation to that of the objective which forms the scanning spot on the information structure. Since the effective scanning spot is smaller than the diffraction-limited spot, the desired tolerance for the position of the non-linear layer is smaller than the depth of focus which is related to the diffraction-limited radiation spot. The non-linear layer may be present in front of the information structure but also behind it if the scanning beam passes through the information layer. In the latter case the beam modulated with the information can be either passed to a detector on the rear side of the record carrier or it can be reflected alongside itself. The reflection layer required for this purpose may be a non-linear layer.

The desired non-linear effect can be realised in various manners, using various types of non-linear optical layers. The present invention therefore also relates to a number of novel optical record carriers provided with such layers.

Figure 6:
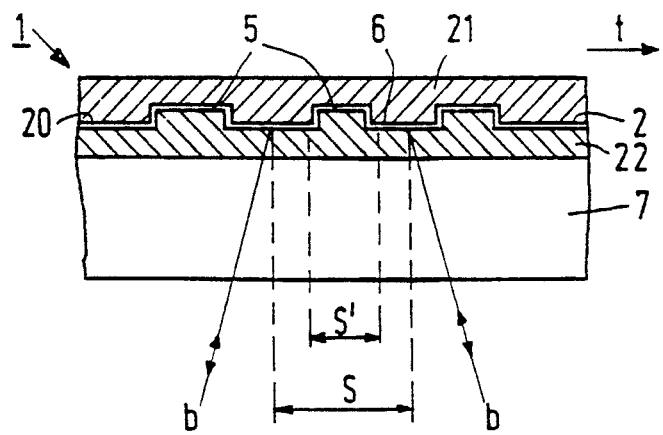
FIGS. 6, 7, 9, 10, 11, 13, 14a, 14b, 16, 17, 18, 19, 20 and 23 show embodiments of a record carrier having a non-linear layer.

A first embodiment of such a record carrier is shown in a tangential cross-section in FIG. 6. The information structure in the information plane 2 comprises pits 5 having, for example a variable length and alternating in the track direction t with intermediate areas 6. A reflecting layer 20 is provided on this structure. This layer may be coated with a protective layer 21. A non-linear layer 22 whose transmission is increased if the incident radiation has a given intensity level is provided between the transparent substrate 7 and the reflecting information structure. The material of the layer 22 and the energy distribution within the scanning spot S are chosen to be such that the transmission is increased mainly in the central area S' of the radiation spot S. A sub-radiation spot S' is then produced with which information pits 5 which are considerably smaller than the radiation spot S can be read. It is also possible for the transmission to be decreased in the central area S' of the radiation spot. Then the non-linear effect has a different sign.

Figure 7:
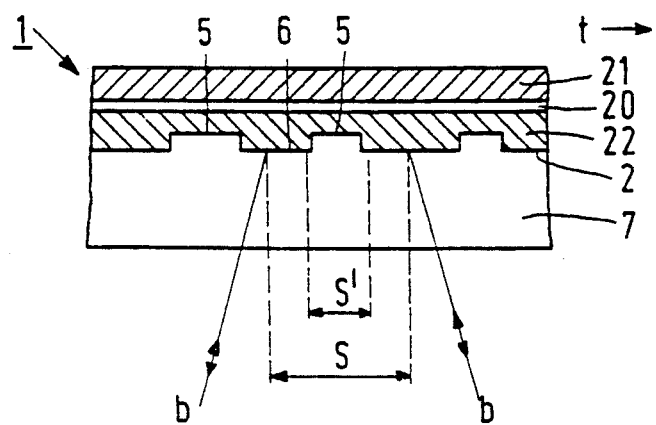

As is shown in FIG. 7 a layer 22 with variable transmission may be alternatively provided behind the information plane 2. The reflecting layer 20 is then provided on the layer 22. The layer 22 in FIG. 7 may be alternatively a reflecting layer whose reflection coefficient is locally changed by the incident radiation. In that case the reflecting layer 20 can be dispensed with.

Figure 8:
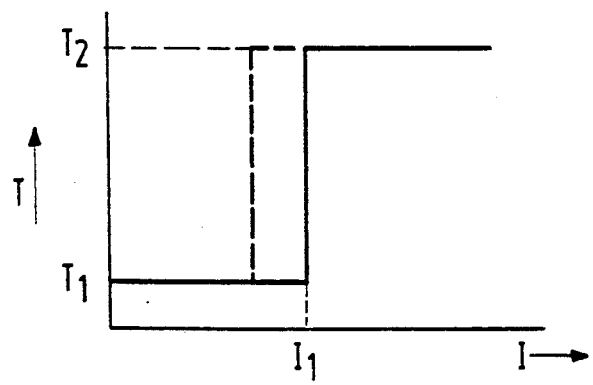
FIG. 8 shows the transmission as a function of the intensity of a bistable optical material.

The layer 22 may be a "bleaching layer" or a layer having a saturating dye whose transmission for a given wavelength increases with an increasing intensity. The layer 22 may be alternatively a layer of a so-called bistable optical material. In FIG. 8 the transmission (T) of such a material is shown as a function of the intensity (I). Below a given intensity $I_1$ the layer has a relatively small transmission $T_1$. As soon as the intensity exceeds the threshold I, the transmission stepwise increases to $T_2$ and further remains constant, even with an increasing intensity. If the intensity is decreased again to below $I_1$, the transmission stepwise decreases to $T_1$. The T-I characteristic curve shows a hysteresis.

The advantage of the bistable optical materials and other materials which are not based on a thermal effect is that they are quickly reversible so that the non-linear optical effect disappears substantially immediately after the radiation spot has disappeared, resulting in an optimum superresolution effect.

FIGS. 6 and 7 show that the layer 22, for example a bleaching layer has one flat side and therefore does not follow the profile of the information structure. When using a thinner layer 22 which is provided, for example by vapour deposition or sputtering, this layer can follow the said profile. The two possibilities occur not only in the case of layers whose transmission is increased, but also in other non-linear layers which will be described hereinafter.

Figure 9:
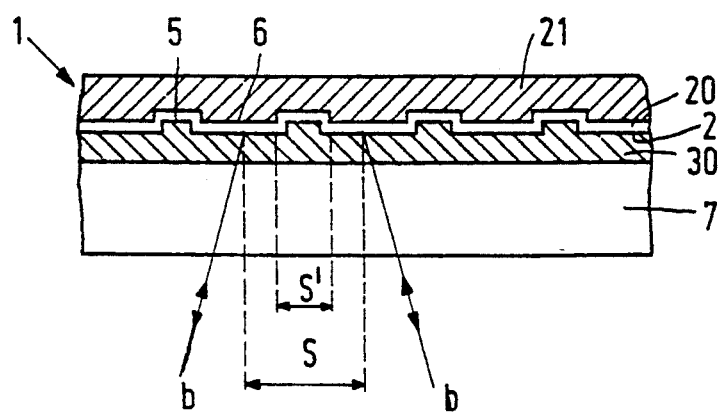

FIG. 9 shows an embodiment of the record carrier in which a variation of the refractive index is utilised for creating a temporary non-linear effect. For example, a layer 30 of a so-called phase change material is present in front of the information structure, for which material it has previously been proposed to use it as an optically inscribable material, hence in an information layer. These materials, examples of which are GaSb and InSb, have the property that they change from the amorphous to the crystalline state, or conversely when they are irradiated with light of a sufficiently high intensity. The complex refractive index then changes so that a written area has a different reflection or transmission coefficient than its surroundings. It has been found that the complex refractive index of this type of materials is temperature dependent to such an extent that, even in the case of irradiation with an intensity remaining below the level at which the conversion from amorphous to crystalline or conversely occurs, there is a sufficiently large variation of the complex refractive index to enable layers of these materials to be used as non-linear layers in the sense of the present invention. In the embodiment of FIG. 9 such a phase change layer 30 is provided in front of the information layer 2. The layer 30 ensures again that the scanning spot S is effectively limited to a sub-scanning spot S' with which the sub-micron areas 5 can be read.

Figure 10:
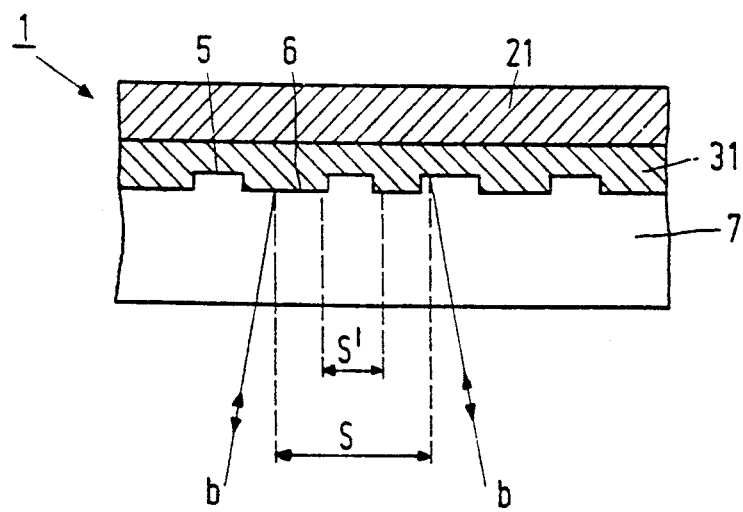

Such a phase change layer may also be provided behind the information layer 2 as is shown in FIG. 10. The layer 31 may then function as a reflecting layer whose reflection coefficient is locally, within an area S' which is smaller than the scanning spot S, increased, for example, by the scanning radiation.

The so-called expansion layers are also suitable as non-linear layers for forming a temporary non-linear optical effect. European Patent Application No. 0,136,070 describes the use of such a layer as an inscribable layer in an optical record carrier. Then the expansion layer is fixedly adhered to a second layer, the so-called retention layer. By irradiation with laser pulses in accordance with the information to be written information areas in the form of surface unevennesses can be written in the expansion layer because this layer has a large thermal coefficient of expansion. Furthermore, this layer has a low glass transition temperature. The unevennesses are passed on to the retention layer which has a relatively low coefficient of expansion and a glass transition temperature above room temperature. After the laser pulse has disappeared, the surface unevennesses continue to exist because the retention layer prevents the expansion layer from assuming its original shape.

Figure 11:
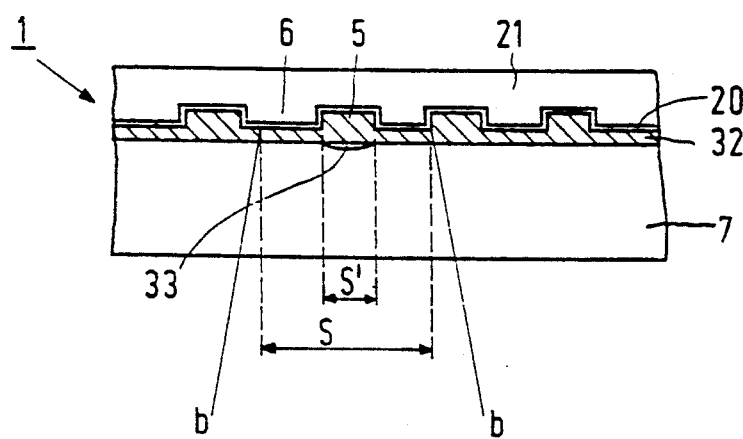

To obtain superresolution, only the expansion layer 32 in FIG. 11 can be used as a non-linear layer. The energy distribution within the scanning spot S and the material parameters of the layer 32, notably the thermal coefficient of expansion, are adapted to each other in such a way that the unevenness 33 is smaller than the scanning spot so that there is again a discrimination within this spot and thus a smaller scanning spot S' is effectively formed.

Figure 12:
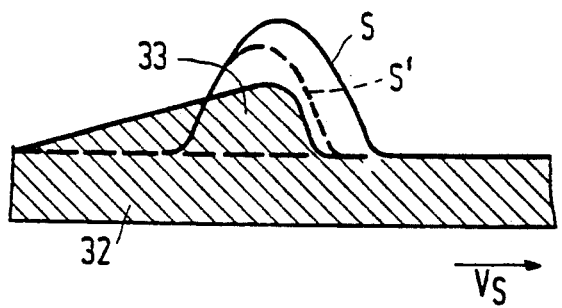
FIG. 12 shows the variation of a thermally generated non-linear optical effect.

The unevenness 33 will not immediately disappear after the radiation spot S has left the relevant position, but is will gradually decrease with respect to time because heat must be dissipated. This means that in the record carrier an elongate deformation becoming smaller towards the rear moves along with the scanning spot over the surface of the layer 32 as is illustrated in FIG. 12. Now this spot narrows and the steepness of the edge increases only on the front side as viewed in the direction of movement $VS_1$ of the scanning spot, compare S and S' in FIG. 12. The signal-to-noise ratio of the superresolution signal is therefore smaller than when using non-linear optical materials in which the non-linear effect disappears substantially simultaneously with the scanning spot.

The non-linear optical effect which is realised by means of the layers 22, 30, 31 and 32 in the FIGS. 6, 7, 9, 10 and 11 can be increased by having each of these layers form part of a pack of layers in the record carrier which pack functions as a resonance structure. The other layers of the packet may be constituted by layers which are already present in the record carrier, such as an information layer, a reflecting layer, separation layers and the like, dependent on the structure of the record carrier.

Figure 13:
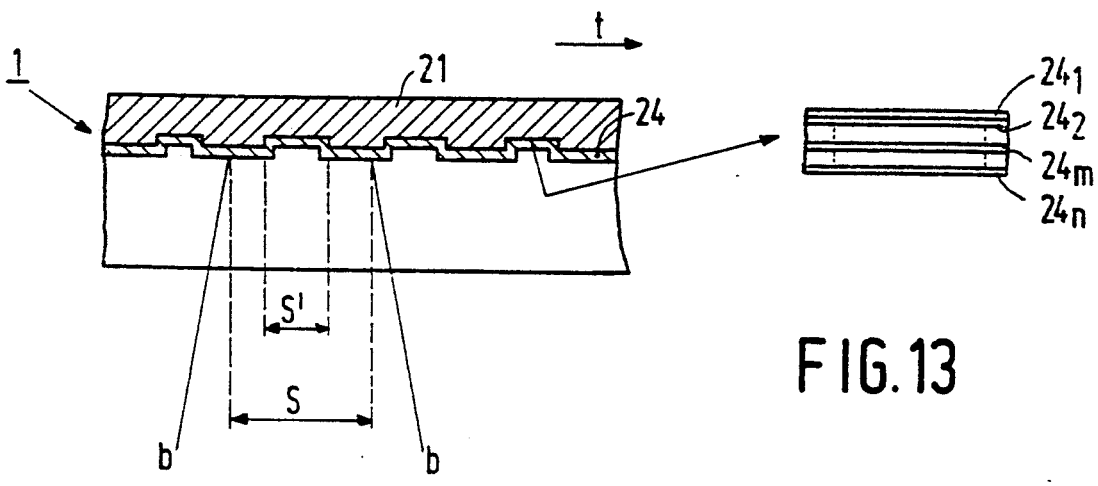

However, it is alternatively possible to add a resonance layer pack as a whole to the record carrier. FIG. 13 shows an example of such as pack of layers 24 which serves as a composite reflecting layer. The pack of layers 24 comprises a sub-layer $24_m$ of a non-linear optical material. The local reflection coefficient of the pack of layers is relatively low as long as it is not impinged by radiation on the relevant position. If a scanning spot is incident on this position, the refractive index of the sub-layer $24_m$ changes so that the reflection of the composite layer 24, mainly where the scanning spot has a high energy, i.e. in the centre of the spot, is increased. Consequently the reflected radiation appears to be coming from a radiation spot S' which is considerably smaller than the scanning spot S.

It is alternatively possible to reduce the reflection in the centre of the scanning spot so that the energy in the centre S' is smaller than outside it. As already noted, it is only important for the superresolution that there is a discontinuity in the scanning spot and that the nature of the discontinuity is not so important.

Figure 14A:
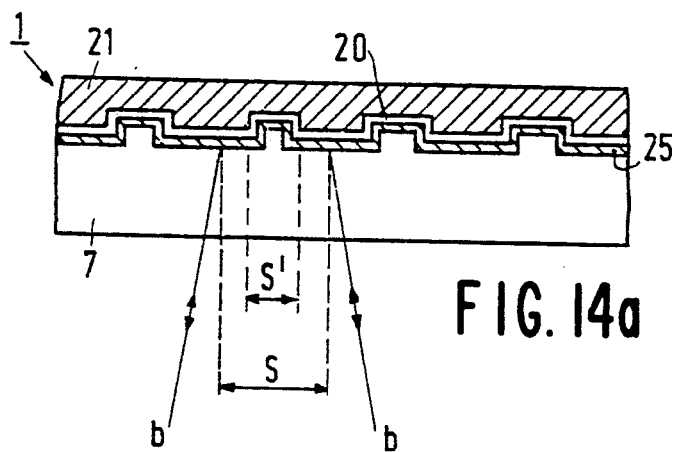
Figure 14B:
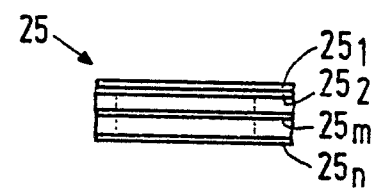

A resonance layer packet may also be provided in front of the information structure as is shown in FIG. 14. The pack 25 is now constituted in such that at a sufficiently high energy of the incident radiation, the transmission is increased or decreased by varying the refractive index of one or more of the sub-layers $25_1 \ldots 25_n$.

Figure 15:
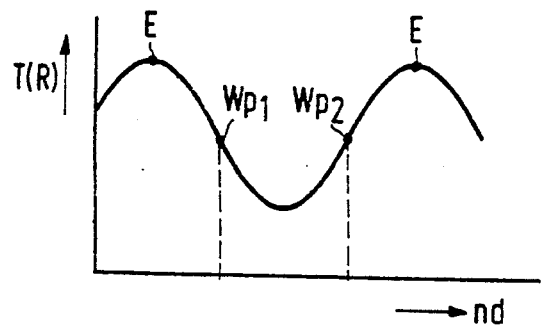
FIG. 15 shows the transmission as a function of the optical thickness of a non-linear layer and of a pack of layers.

For a transparent layer the transmission as a function of the optical thickness $n \cdot d \cdot$, in which n is the refractive index and d is the geometrical thickness, has for example a variation as is shown in FIG. 15. To obtain optimally combined non-linear and resonance effect, it must be ensured that both for the non-linear layer and for the pack of layers the product $n \cdot d \cdot$ and the sum of the products $\Sigma n_i d_i$ of all layers is such that the corresponding working point $W_p$ on the curve in FIG. 15 is located at the area where this curve has a maximum slope. In practice this means that $n \cdot d \cdot$ is unequal to $N \cdot \lambda/4$, in which N is an integer, because for $N \cdot \lambda/4$ the curve will exhibit extrema E. For a reflecting pack of layers the reflection as a function of $n \cdot d \cdot$ and $\Sigma n_i d_i$ has a similar variation as the transmission of a transparent pack of layers and similar considerations are valid.

In the embodiments described the information structure is a phase structure, which is read on the basis of the phase difference introduced in the read beam by the information areas which may comprise not only pits but also hills on the information surface. However, the information structure may alternatively be an amplitude structure, which likewise as the phase structure, can be read both in reflection and in transmission. The information areas then have a different reflection or transmission coefficient than their ambience.

In the record carriers described the information structure is a permanent structure which can be read only. The information areas are smaller than those of the known record carriers. The manufacture of such record carriers is readily possible by means of known techniques. It is true that a radiation source, for example a laser with a shorter wavelength must be used then and the writing objective must then have a larger numerical aperture, but this is no drawback because the information need only be inscribed once in a so-called Master disc. A very large number of copies of the Master disc can be manufactured by means of known pressing or replica techniques. The write apparatus may therefore be more expensive and it may be equipped with a gas laser having a short wavelength and a write objective having a large numerical aperture and a small depth of focus. However, the invention may also be used when inscribing the master disc so as to be able to write the sub-micron information areas with simpler apparatuses or to write even smaller information areas with the same apparatuses.

Figure 16:
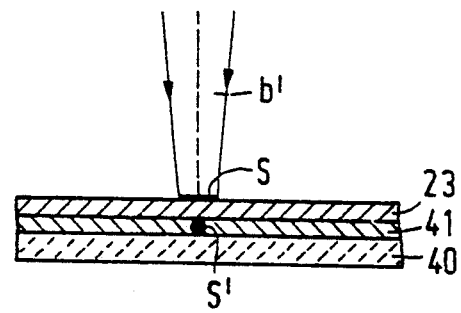

FIG. 16 shows a part of a master record carrier in a tangential cross-section. In principle, this master comprises a substrate 40 and a radiation-sensitive layer 41. According to the invention a non-linear optical layer, for example a bleaching layer 23 is provided on the layer 41. A write beam b', which is intensity-modulated in accordance with the information to be written and which is focused to a diffraction-limited radiation spot S by means of an objective system not shown, increases the transmission of the layer 23 within an area which is smaller than the spot S. Consequently the photosensitive layer is exposed with a radiation spot S' which is smaller than S and also the information areas are correspondingly smaller. After the entire master record carrier has been scanned by the write beam, the layer 23 is removed and the exposure pattern is converted by means of a known developing and etching process into a relief pattern which is suitable for replication.

In addition to the embodiments shown in FIGS. 6, 7, 9, 10, 11, 13 and 14 all of which relate to record carriers having a permanent information structure, the invention can be alternatively used in record carriers which can be written by a user himself. The inscribable record carriers are preferably provided by their manufacturers with a servo-track structure in the form of a spiral track or a plurality of concentric tracks. These tracks may be completely blank. When writing information the position of the write spot with respect to the servo-tracks can be detected and re-adjusted so that this spot accurately follows the servo-tracks. This has the advantage that the write/read apparatus of the user need not be provided with very accurate and expensive mechanical positioning and guiding mechanisms. The servo-tracks may also comprise address information to enable writing and reading at arbitrary positions on the record carrier. If the inscribable record carriers are intended for recording a user program a part of which is the same for all users, this part, or the standard information, may be prerecorded so that a user only needs to complete it with his own specific information.

The servo-track structure, or generally the prerecorded permanent information can be provided via a mastering and replication process on a carrier which is subsequently provided with an inscribable layer. The master record carrier may be provided with a non-linear optical layer such as a bleaching layer, as described with reference to FIG. 16, so that also the servo-tracks can be narrower and the possible address and information areas can be smaller than has hitherto been conventional.

Figure 17:
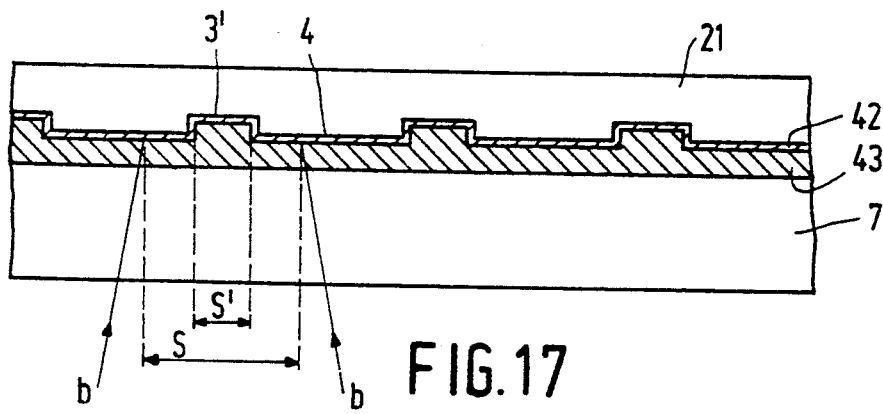

A record carrier with a servo-track structure is provided with a layer of inscribable material and, according to the invention also with a non-linear layer. FIG. 17 shows a portion of such a record carrier in a radial cross-section. The servo-tracks are denoted by 3' and the intermediate lands are denoted by 4. The reference numeral 42 denotes the inscribable layer and 43 denotes the non-linear layer. This layer is not only used for reading with superresolution but also for forming information areas during writing, which areas may be considerably smaller than the write spot S. These information areas can be written in the servo-tracks 3' as is shown in FIG. 17, but also in the intermediate lands 4. Moreover, the servo-tracks may be both grooves in the substrate surface and ridges on this surface.

The once inscribable and non-erasable layer 42 may be an ablative layer, for example a reflecting layer in which holes which do not reflect or reflect to a lesser extent can be formed by means of a write beam.

The layer 42 may alternatively comprise a phase change material in which a write beam locally establishes a transition from the amorphous to the crystalline phase, or conversely and hence a change of the refractive index (or reflection coefficient) so that the written information areas are distinguished from their ambience by a different transmission or reflection.

The phase change material is also suitable for writing and erasing information several times. The information which is written with a radiation beam of high intensity is then read with a radiation beam of a lower intensity than that of the write beam, whilst erasing is effected at an intensity between the intensity of the write beam and that of the read beam. In practice the write, read and erasing functions can be performed by one beam which can be switched between three different intensity levels.

The inscribable information layer comprising a phase change material can be combined with a non-linear layer also comprising a phase change material. However, it is alternatively possible that the record carrier comprises only one phase change layer whose properties are used both for writing the information and for generating a non-linear optical effect during reading.

Figure 18:
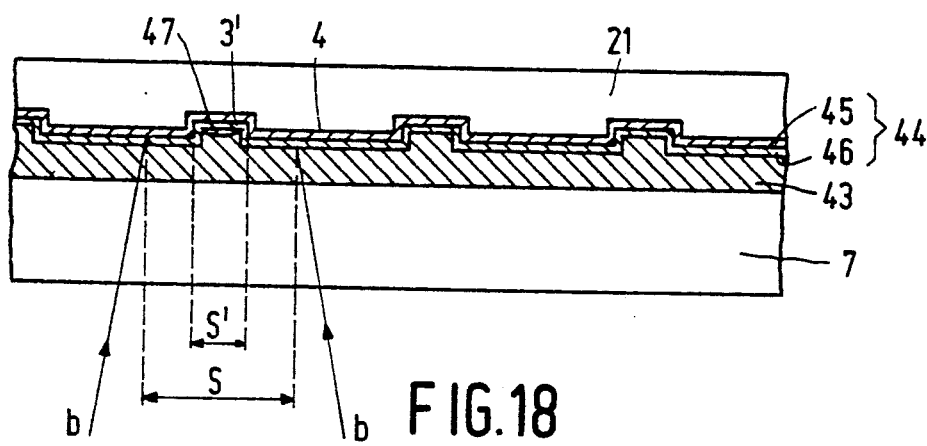

FIG. 18 shows another embodiment of a record carrier which can be inscribed and erased several times. The inscribable layer 44 comprises a double layer of an expansion layer 45 and the retention layer 46 in which an information area in the form of an unevenness 47 can be written by means of a laser beam having a first wavelength. The information can be read or erased by means of a beam having a low intensity and erased by means of a beam having a second wavelength.

With a suitable choice of the parameters of the expansion layer this layer may not only be used as an information layer but also as a layer for creating a non-linear optical effect. When reading the information areas in the form of unevennesses in the expansion layer, a temporary small variation is provided in such an unevenness by means of the read beam, which variation disappears at a later stage so that the unevenness regains its original shape and the information is maintained.

Figure 19:
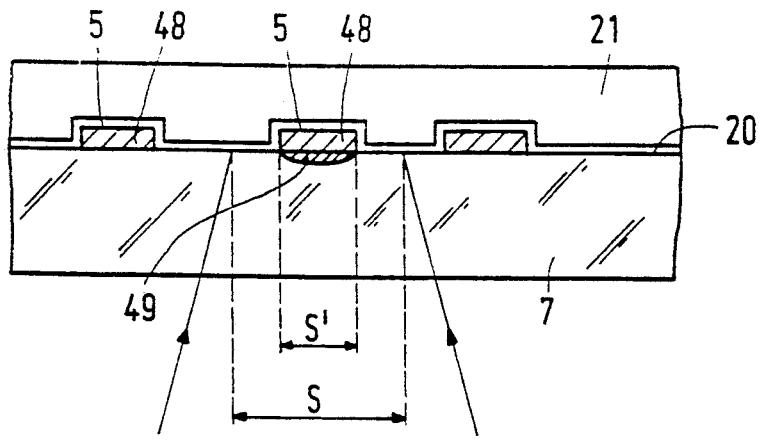

The material of the said expansion layer which is a rubber-like material may not only be used as an inscribable and erasable material but also as a material for the information layer in a record carrier having a permanent information structure. A first possibility, as shown in FIG. 19, is for the information to be laid down in information pits 5 which are filled with the said rubber-like material 48. When reading this information structure, the material in the pits is temporarily deformed (49) so that a discontinuity within the radiation spot S is created and non-linear effect occurs.

Figure 20:
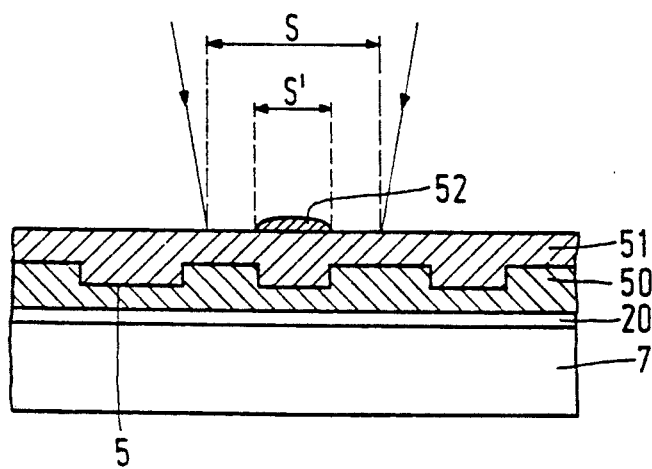

It is also possible to provide a permanent information structure in a rubber-like layer as is shown in FIG. 20. In this Figure the rubber-like information layer is denoted by the reference number 50 and the information areas are denoted by the reference numeral 5. A second rubber-like layer 51 which deforms more easily than the layer 50 may be provided on the information layer. When reading the information, the read radiation temporarily deforms the layer 51 at the location (52) of the scanning spot S so that a non-linear optical effect is obtained again.

Each of the inscribable information layers described so far: the ablative layer, the phase change layer and the expansion layer can be combined with each of the said non-linear layers: a layer having a changing transmission, a phase change layer or an expansion layer. The non-linear layers may be provided both in front of and behind the information layer and may form part of a pack of layers in the record carrier, which pack forms a resonance structure.

Figure 21:
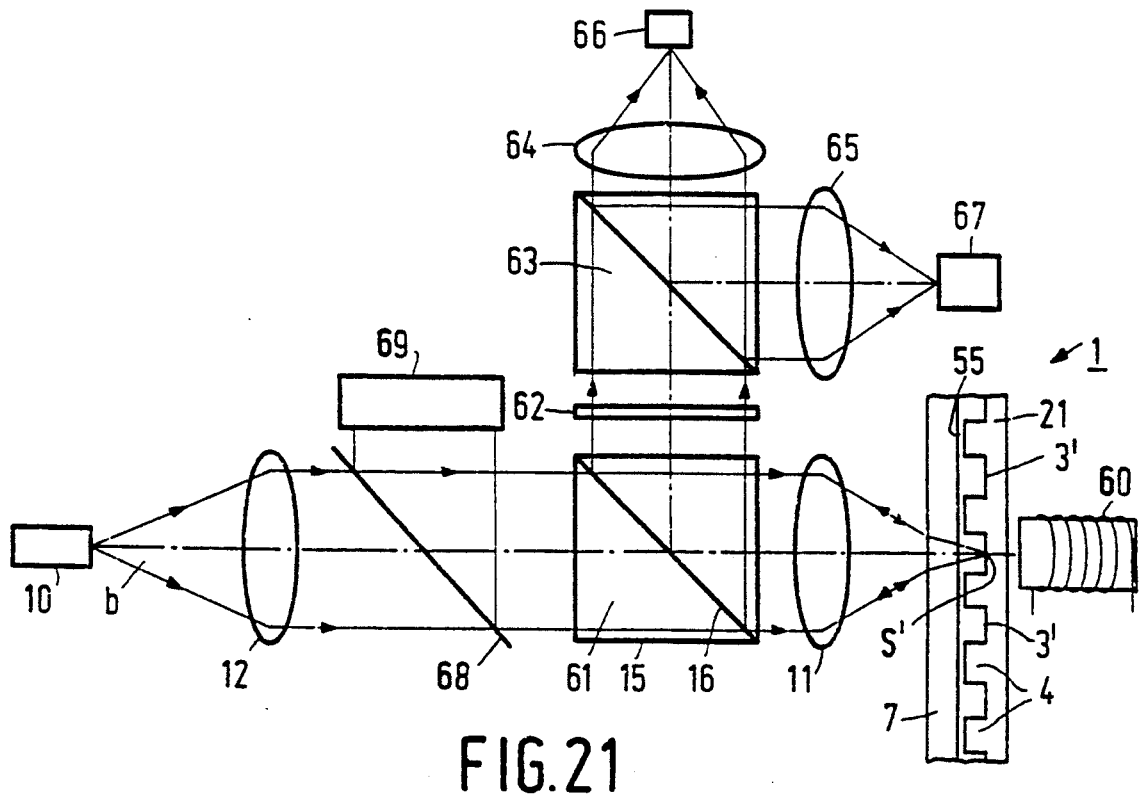
FIG. 21 shows a magneto-optical write and read apparatus.

Another embodiment of an inscribable and erasable record carrier is the magneto-optical record carrier comprising a substrate, a previously provided servo-track structure and a magneto-optical layer. Such a record carrier and a write and a read apparatus for this carrier, described in Philips Technical Review, Vol. 42, No. 2, August 1985, pages 37-47 are shown diagrammatically in FIG. 21.

The servo-tracks of the record carrier 1 are denoted by the reference numeral 3'. The reference numeral 7 denotes the substrate and 55 denotes the magneto-optical layer. A radiation beam b coming from a source 10, for example a semiconductor diode laser is converted by a collimator lens 12 into a parallel beam and focused by the objective system 11 to a diffraction-limited scanning spot S' in the magneto-optical layer 55. The irradiated area of this layer is present in a magnetic field which is generated by a magnet coil 60. The magneto-optical layer is premagnetised in a direction perpendicular to the surface of the record carrier.

During writing the radiation beam is intensity modulated in accordance with the information to be written. When moving the record carrier and the radiation spot S' relative to each other, the magneto-optical layer is heated at certain positions in such a way that the direction of magnetisation is reversed in the direction of the external magnetic field which is opposed to the direction of premagnetisation.

When reading these written information areas in the form of magnetic domains, the record carrier is exposed with a continuous beam having a lower intensity than the write beam. The magnetic domains cause a small rotation of the polarisation direction of the read beam. This rotation, $\pm\theta_k$ dependent on the sign of the local magnetisation, is referred to as the Kerr rotation. The beam reflected by the record carrier and having a modulated polarisation direction, is directed towards the detection branch, for example by means of a beam-splitting prism 61. This branch comprises a $\lambda/2$ plate 62 whose principal axis extends at an angle of 22.5° to the original polarisation direction of this beam. Consequently the polarisation plane is rotated through 45° with a modulation of $\pm\theta_k$. A polarisation-sensitive beam splitter 63 splits the beam into two mutually perpendicularly polarised sub-beams which are received via the lenses 64 and 65 by the detectors 66 and 67. The angular modulations $\pm\theta_k$ are then converted into amplitude modulations on the detectors. Since their phases are opposed, the difference signal is an accurate read signal.

The portion of the beam reflected by the record carrier and passed by the prism 61 may be directed by a further beam splitter 68, such as a semi-transparent mirror, to a further detection branch 69 in which tracking errors and focusing errors can be detected both during writing and during reading.

To erase the record carrier, the external magnetic field is reversed over so that is acquires the same direction as the premagnetisation of the magneto-optical layer 55 and the record carrier is exposed with a continuous beam. Consequently the written domains regain their original direction of magnetisation.

For further particulars of the record carrier and the detection methods and apparatuses therefor reference is made to "Philips' Technical Review", Vol 42, No. 2, pages 37-47.

The invention advantageously utilises the fact that the said Kerr rotation is greatly dependent on the temperature for certain magneto-optical materials such as gadolinium terbium-iron-cobalt compound. Due to the energy distribution within the diffraction-limited scanning spot a portion of the scanning spot will experience a different Kerr rotation than the rest of the spot. The result is that a discrimination within the scanning spot is established again.

Magneto-optical reading may not only be based on Kerr rotation but also on a variation of the ellipticity of the read beam polarisation. This variation is also temperature dependent for certain magneto-optical materials to that the invention can also be used in magneto-optical record carriers using the variations in ellipticity of the polarisation caused by the magnetic domains.

Figure 22:
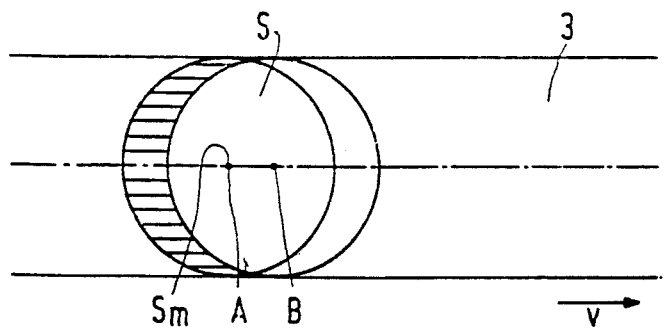
FIG. 22 shows a method of inscribing magnetic domains in a magneto-optical record carrier.

Use of the invention enables magnetic domains to be read which are smaller than has hitherto been conventional. These small magnetic domains can be obtained by means of a special way of writing, which is illustrated in FIG. 22. It is assumed that the write spot S moves to the right at a speed V relative to the track portion 3 to be written of the record carrier and that at the instant $t_0$ the centre $S_m$ of the spot is present at point A. The magnetic field is then directed, for example, forwards, perpendicular to the plane of the drawing and the entire circular surface under the spot S is magnetised in that direction. After the centre of the radiation spot has moved to B, the magnetic field is reversed. Then the circular area present under the spot S acquires an opposite direction of magnetisation. As it were, a portion of the written domain with centre A is erased thereby. The result is that the remaining domain only covers the shaded area D. The length of this domain is determined by $V\times t$ in which t is the period during which a magnetic field has been present in a given direction. The written domains are thus considerably smaller than the diameter of the write spot.

Figure 23:
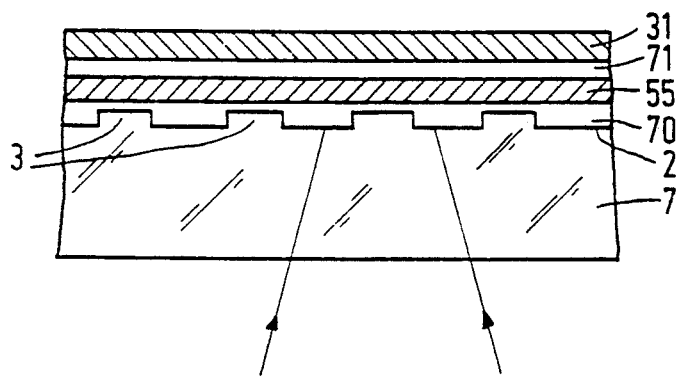

One or the other of the above-mentioned non-linear layers can also be provided in a magneto-optical record carrier so that the non-linear effect of the magneto-optical layer is increased, resulting in both writing and reading of this record carrier being improved. FIG. 23 shows an example of such a record carrier. In this Figure the reference numeral 7 denotes a transparent substrate on which a servo-track structure denoted by the tracks 3 is provided. This structure is coated with a dielectric layer 70 of, for example Aluminum Nitride. The magneto-optical layer 55 is present on this layer. The layer 55 is followed by a second dielectric layer 71 also comprising, for example Aluminum Nitride. This layer carries a reflecting non-linear optical layer, for example a phase change layer 31.

It is of course alternatively possible to use only the non-linear effect of an extra layer such as the layer 31 in FIG. 23 in a magneto-optical record carrier in which the magneto-optical material is not us much dependent of temperature.

The signal-to-noise ratio of the signal read from a magneto-optical record carrier can be increased by increasing the intensity of the read beam. Such an intensity increase is also favourable when writing the magnetic domains.

The record carriers according to the invention can be read and written with known scanning apparatuses in which the detection aperture is in principle equal to the aperture of the objective with which the scanning spot is formed. According to a further aspect of the invention the detection aperture is considerably larger than the scanning beam aperture of the objective. The super-resolution can then be utilised to an optimum extent.

For an apparatus intended for scanning a record carrier in transmission the detection aperture can be increased without any problem because the part of the optical system which is present behind the record carrier on the side of the detector need not have nay imaging quality and only needs to collect radiation.

Figure 24:
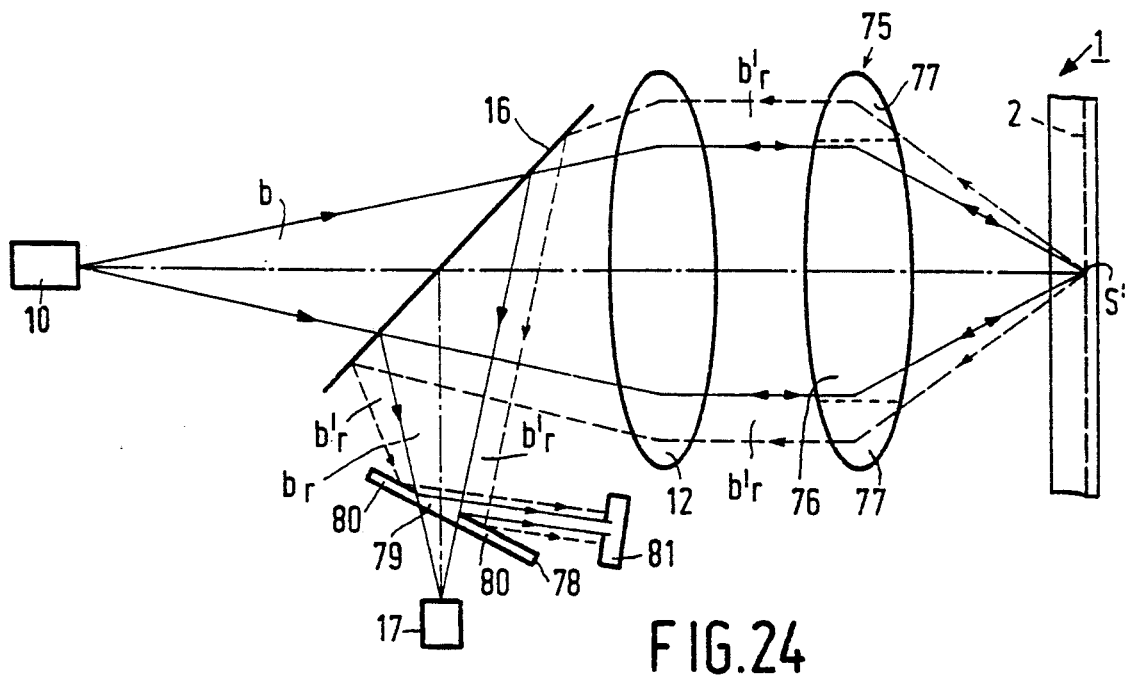
FIG. 24 shows an embodiment of a read apparatus according to the invention.

When scanning a reflecting record carrier the reflected radiation can only reach the detector via the objective, which must form the diffraction-limited radiation spot and which must have a high optical quality. According to the present invention a larger objective 75 can be used whose central portion 76 is well corrected and whose peripheral position has a lesser quality, as is shown in FIG. 24. The extra peripheral portion 77 can collect the radiation diffracted under larger angles and in which the non-linear effect is prominent. The beam b supplied by the source 10 and collimated by the lens 12 only fills the central portion 76 of the objective 75 so that a high-quality scanning spot S is formed on the information plane 2.

The objective 75 is FIG. 24 may be a single aspherical lens element or a holographic lens or a lens having a radially varying refractive index.

It is of course alternatively possible to arrange an extra annular lens around a well-corrected conventional objective.

The part of the radiation reflected by the record carrier and passing through the central portion 76 of the objective 75 and the part of this radiation which is collected by the annular portion 77 can be received by one detector 17.

Under some circumstances it may be advantageous to detect these radiation parts separately. To this end a second beam splitter 78, for example in the form of a plate having a radiation transmitting central portion 79 surrounded by a reflecting portion 80 may be arranged in the radiation path behind the first beam splitter 16. Now only the radiation passing through the central portion 76 of the objective 75 reaches the original detector 17, whilst the radiation passing through the annular lens portion 77 is detected by a separate, for example annular, detector 81. If the non-linear effect introduces a phase which is opposed to that of the linear effect so that, as shown in FIG. 2, the modulation transfer function would have a local minimum, this arrangement provides the possibility of compensating for this minimum by subtracting the detector signals from each other instead of adding them together. Moreover, the superresolution signal can then be detected separately and the apparatus is also suitable for scanning conventional, linear record carriers.

What is claimed is:

1. An optical record carrier having an information region therein for recording of information areas, said information areas being scannable by a scanning beam of radiation which is focussed into a scanning spot in such region, characterized in that said record carrier comprises a layer of non-linear optical material arranged adjacent said information region and having a property which varies as a function of the intensity of incident radiation, said property being a optical characteristic which, responsive to scanning of said information region by a beam of said radiation having a central portion having an intensity higher than that of a surrounding portion of said beam of radiation, changes in the portion of the layer being scanned by said central portion, and means, in addition to said property of said layer, for storing information as a succession of information areas in said information region.

2. A carrier as claimed in claim 1, having a plurality of information areas recorded in said information region, said areas being readable by said scanning beam.

3. A carrier as claimed in claim 1, adapted for having information areas written therein once by a recording scanning beam, and for having said information areas read a plurality of times by a reading scanning beam, characterized in that said carrier includes a permanent servo track structure having a given alignment with respect to said information region.

4. A carrier as claimed in claim 1, characterized in that said optical characteristic changes reversibly during scanning to record information areas.

5. An optical record carrier having an information region therein for recording of information areas, said information areas being scannable by a scanning beam of radiation which is focussed into a scanning spot in such region, characterized in that said record carrier comprises a layer of non-linear optical material arranged adjacent said information region and having a property which varies as a function of the intensity of incident radiation, said property being an optical characteristic which, responsive to scanning of said information region by a beam of said radiation having a central portion having an intensity higher than that of a surrounding portion of said beam of radiation, changes reversibly in the portion of the layer being scanned by said central portion, and means, in addition to said property of said layer, for storing information as a succession of information areas in said information region.

6. A carrier as claimed in claim 5, characterized in that said means for storing information has a further optical characteristic which changes permanently during scanning by a recording scanning beam, said further optical characteristic being unaffected during scanning by a scanning beam.

7. A carrier as claimed in claim 5, having a plurality of information areas recorded in said information region, said areas being readable by said scanning beam.

8. A carrier as claimed in claim 5, characterized in that said information region is an information plane.

9. A carrier as claimed in claim 5, characterized in that said information region is an inscribable layer which is free from information.

10. A carrier as claimed in claim 5, characterized in that said non-linear optical material has a recovery time which is less than a time required for a scanning spot to be moved, relatively with respect to the carrier, to an adjoining information area.

11. A carrier as claim 5, characterized in that said means for storing information comprises a profile of a surface of said layer.

12. A carrier as claimed in claim 11, characterized in that said profile consists of a succession of pits in said surface.

13. A carrier as claimed in claim 5, characterized in that said means for storing information comprises a further layer of material adjacent said layer of non-linear optical material.

14. A carrier as claimed in claim 5, characterized in that said non-linear optical material has a recovery time which is less than a time required for a scanning spot to be moved, relatively with respect to the carrier, to an adjoining information area.

15. A carrier as claimed in claim 11, characterized in that said optical characteristic is optical transmission.

16. A carrier as claimed in claim 15, characterized in that said layer is a layer of a saturating dye.

17. A carrier as claimed in claim 15, characterized in that said layer consists of a bistable optical material.

18. A carrier as claimed in claim 5, characterized in that said information layer comprises a magneto-optical material, and the change in optical characteristic is a change in polarization.

19. A carrier as claimed in claim 5, characterized in that said carrier further comprises at least one additional layer of optical material, all said layers together forming a resonance structure for the scanning beam.

20. A method of optically scanning information areas in an information region, comprising the steps of:
   providing a record carrier comprising a layer of non-linear optical material arranged adjacent an information region and having a property which varies as a function of the intensity of incident radiation, and means, in addition to said layer of non-linear optical material, for storing information as succession of information areas in said information region,
   focusing a scanning beam of radiation into a scanning spot having a given depth of focus which includes said information region and said layer of non-linear optical material, said scanning spot having a surrounding portion and a central portion having a intensity higher than the intensity of said surrounding portion, and
   moving said scanning spot and said record carrier relative to each other so as to scan the information region,
   whereby an effective size of said scanning spot is reduced.

21. A method as claimed in claim 20, wherein said non-linear optical material has a given recovery time, characterized in that said moving step comprises relative movement at a speed slow enough that optical characteristics of said layer during scanning of one information area have recovered prior to scanning of an adjoining information area.

22. A method as claimed in claim 20, characterized in that said focusing step comprises forming a diffraction-limited scanning spot.

23. A scanning apparatus for an optical record carrier having an information plane therein on which information areas are recorded, said information areas being readable by a scanning beam of radiation which is focused into a scanning spot on such plane,
   wherein said record carrier includes therein a layer of non-linear optical material having a property which varies as a function of the intensity of incident radiation, said layer being arranged such that, upon irradiation for reading by a scanning beam produced by a diffraction-limited objective lens system forming a scanning spot, said scanning spot having a central portion and a surrounding portion, and said central portion having an intensity higher than that of said surrounding portion, the optical characteristic of said non-linear optical material changes non-destructively in a region being scanned by said central portion, and
   said scanning apparatus comprises means for providing relative movement of said record carrier with respect to said apparatus; means for scanning said record carrier by a readout scanning beam, comprising a radiation source and a scanning beam objective lens system defining a scanning beam aperture for focusing a beam of radiation from said source into a scanning spot on said information plane in said record carrier; and a detection system including a radiation-sensitive detector for converting radiation from said information plane into an electrical signal;
   characterized in that said scanning beam objective lens system is a diffraction-limited system whereby said scanning spot has a size determined by said scanning beam aperture, and
   said detection system has an aperture which is larger than said scanning beam aperture,
   whereby information areas smaller than the size of said spot can be read.

24. An apparatus as claimed in claim 23, wherein said information plane is a reflecting surface, characterized in that said objective lens system comprises a round central portion having optical correction and optical quality sufficient to form a diffraction-limited radiation spot at said information plane, and a contiguous annular portion having optical correction and optical quality sufficient to transmit radiation reflected from said information plane.

25. An apparatus as claimed in claim 24, further comprising an additional radiation-sensitive detector for radiation transmitted through said annular portion of the objective lens system.

26. A carrier as claimed in claim 5, characterized in that said characteristic is the refractive index of said material.

27. A carrier as claimed in claim 26, characterized in that said property is a phase transition affecting said refractive index, and in that said information region is also formed in said layer.

* * * * *